(12) United States Patent
Arancio (10) Patent No.: US 11,703,953 B1
(45) Date of Patent: Jul. 18, 2023

(54) PHONEMIC KEYBOARD APPARATUS AND METHOD

(71) Applicant: Angela Arancio, Middlesex, NJ (US)

(72) Inventor: Angela Arancio, Middlesex, NJ (US)

( * ) Notice: Subject to any disclaimer, the term of this patent is extended or adjusted under 35 U.S.C. 154(b) by 0 days.

(21) Appl. No.: 18/107,370

(22) Filed: Feb. 8, 2023

(51) Int. Cl.
*G06F 3/0488* (2022.01)
*G09B 5/00* (2006.01)
*G06F 3/02* (2006.01)
*G10L 13/02* (2013.01)
*G06F 3/023* (2006.01)

(52) U.S. Cl.
CPC ............ *G06F 3/0219* (2013.01); *G06F 3/023* (2013.01); *G10L 13/02* (2013.01)

(58) Field of Classification Search
None
See application file for complete search history.

(56) References Cited

U.S. PATENT DOCUMENTS

2006/0166178 A1* 7/2006 Driedijk ................. G09B 19/06 434/307 R
2016/0370911 A1* 12/2016 Tanenbaum ............ G06F 3/018

* cited by examiner

*Primary Examiner* — Carl Adams
(74) *Attorney, Agent, or Firm* — Walter J. Tencza, Jr.

(57) ABSTRACT

An apparatus which includes: a computer processor; a computer memory; and a computer display; and an audio speaker; wherein the computer memory has computer programming stored therein which is configured to be implemented by the computer processor to display a keyboard having a plurality of keys on the computer display; wherein each of the plurality of keys includes indicia for a phonemic sound; and wherein the computer programming stored in the computer memory is configured to be implemented by the computer processor to cause a sound corresponding to the phonemic sound of each corresponding key of the plurality of keys to be emitted from the audio speaker when each key of the plurality of keys is selected. A plurality of grapheme outcomes may be determined for each of the plurality of keys when each of the plurality of keys is selected.

12 Claims, 9 Drawing Sheets

| ID # | Char | Row # | HTML | Updated | PN #1 | PN #2 |
|---|---|---|---|---|---|---|
| 1 | /a/ | 1 | a | Y | a | au |
| 2 | /e/ | 1 | e | Y | e | ea |
| 3 | /i/ | 1 | i | Y | i | ui |
| 4 | /o/ | 1 | o | Y | a | ho |
| 5 | /u/ | 1 | u | Y | u | o |
| 6 | /ā/ | 1 | ā | Y | a | ai |
| 7 | /ē/ | 1 | ē | Y | e | ee |
| 8 | /ī/ | 1 | ī | Y | i | y |
| 9 | /ō/ | 1 | ō | Y | o | oa |
| 10 | /ū/ | 1 | ū | Y | u | eau |
| 11 | /ng/ | 1 | ng | Y | ing | ng |
| 12 | /b/ | 2 | b | Y | b | bb |
| 13 | /d/ | 2 | d | Y | d | dd |
| 14 | /f/ | 2 | f | Y | f | ff |
| 15 | /g/ | 2 | g | Y | g | gg |
| 16 | /h/ | 2 | h | Y | h | wh |
| 17 | /j/ | 2 | j | Y | j | ge |
| 18 | /oo1/ | 2 | ͝ | Y | o | oo |
| 19 | /öö/ | 2 | ȯȯ | Y | o | oo |
| 20 | /ow/ | 2 | ow | Y | ow | ou |
| 21 | /oy/ | 2 | oy | Y | oi | oy |
| 22 | /th/ | 2 | th | Y | th | |
| 23 | /thv/ | 2 | thv | Y | th | |
| 24 | /k/ | 3 | k | Y | c | k |
| 25 | /l/ | 3 | l | Y | l | ll |
| 26 | /m/ | 3 | m | Y | m | mm |
| 27 | /n/ | 3 | n | Y | n | nn |
| 28 | /p/ | 3 | p | Y | p | pp |
| 29 | /r/ | 3 | r | Y | r | rr |
| 30 | /ar/ | 3 | ar | Y | ar | are |
| 31 | /air/ | 3 | air | Y | air | are |
| 32 | /or/ | 3 | or | Y | or | ore |
| 33 | /ch/ | 3 | ch | Y | ch | tch |
| 34 | /sh/ | 3 | sh | Y | sh | ss |
| 35 | /zh/ | 3 | zh | | ge | as |
| 36 | /s/ | 4 | s | | s | ss |
| 37 | /t/ | 4 | t | | t | tt |
| 38 | /v/ | 4 | v | | v | ve |
| 39 | /w/ | 4 | w | | w | wh |
| 40 | /y/ | 4 | y | | y | i |
| 41 | /z/ | 4 | z | | z | zz |
| 42 | /ir/ | 4 | ir | | ear | eer |
| 43 | /ur/ | 4 | ur | | ur | ir |
| 44 | /ks/ | | | | x | cc |
| 45 | /kw/ | | | | qu | |

| ID# | PN #3 | PN #4 | PN #5 | PN #6 | PN #7 | PN #8 | PN #9 | PN #10 |
|---|---|---|---|---|---|---|---|---|
| 1 | ai | | | | | | | |
| 2 | ie | a | eo | ei | ae | ai | | |
| 3 | y | ie | e | o | u | | | |
| 4 | au | aw | ough | augh | | | | |
| 5 | oo | ou | | | | | | |
| 6 | eigh | aigh | ay | ea | ey | ei | a_e | au |
| 7 | ea | y | ey | oe | ie | i | ei | eo |
| 8 | igh | ie | uy | ye | eigh | i_e | ai | is |
| 9 | ow | oe | o_e | ough | eau | oo | ew | |
| 10 | | | | | | | | |
| 11 | nk | ngue | n | | | | | |
| 12 | | | | | | | | |
| 13 | ed | | | | | | | |
| 14 | ph | gh | if | ft | | | | |
| 15 | gh | gu | gue | | | | | |
| 16 | | | | | | | | |
| 17 | g | dge | di | gg | d | | | |
| 18 | u | ou | | | | | | |
| 19 | ew | ue | ou | oe | ough | ui | u_e | oeu |
| 20 | ough | | | | | | | |
| 21 | | | | | | | | |
| 22 | | | | | | | | |
| 23 | | | | | | | | |
| 24 | ck | ch | que | lk | | | | |
| 25 | | | | | | | | |
| 26 | mb | mn | lm | | | | | |
| 27 | kn | gn | pn | mn | | | | |
| 28 | | | | | | | | |
| 29 | wr | er | ir | ur | or | ear | our | rh |
| 30 | or | our | | | | | | |
| 31 | ear | ere | ayer | | | | | |
| 32 | oor | our | | | | | | |
| 33 | | | | | | | | |
| 34 | tio | cia | ce | s | ch | ti | | |
| 35 | si | s | | | | | | |
| 36 | c | sc | ce | se | ps | st | | |
| 37 | ed | | | | | | | |
| 38 | f | | | | | | | |
| 39 | | | | | | | | |
| 40 | | | | | | | | |
| 41 | ze | s | se | ss | x | | | |
| 42 | irr | | | | | | | |
| 43 | er | or | ear | our | | | | |
| 44 | cks | ks | | | | | | |
| 45 | | | | | | | | |

| ID# | PN #11 | PN #12 |
|-----|--------|--------|
| 1   |        |        |
| 2   |        |        |
| 3   |        |        |
| 4   |        |        |
| 5   |        |        |
| 6   | er     | et     |
| 7   | ay     |        |
| 8   |        |        |
| 9   |        |        |
| 10  |        |        |
| 11  |        |        |
| 12  |        |        |
| 13  |        |        |
| 14  |        |        |
| 15  |        |        |
| 16  |        |        |
| 17  |        |        |
| 18  |        |        |
| 19  |        |        |
| 20  |        |        |
| 21  |        |        |
| 22  |        |        |
| 23  |        |        |
| 24  |        |        |
| 25  |        |        |
| 26  |        |        |
| 27  |        |        |
| 28  |        |        |
| 29  |        |        |
| 30  |        |        |
| 31  |        |        |
| 32  |        |        |
| 33  |        |        |
| 34  |        |        |
| 35  |        |        |
| 36  |        |        |
| 37  |        |        |
| 38  |        |        |
| 39  |        |        |
| 40  |        |        |
| 41  |        |        |
| 42  |        |        |
| 43  |        |        |
| 44  |        |        |
| 45  |        |        |

PHONEMIC KEYBOARD APPARATUS AND METHOD

FIELD OF THE INVENTION

This invention relates to devices and methods for creating text based on phonetics.

BACKGROUND OF THE INVENTION

Phonemes are the sounds made when speaking a language. The English language, for example has roughly forty-four sounds in the language.

Graphemes are the letters in which you spell the phonemic sound. For example, in the English language the /k/ sound can be spelled with a "c" or "k". . . etc.

Digraphs are two letters that spell a phonemic sound. For example, in the English language the /k/ sound can be spelled with a "ck", which is also considered and will be called a grapheme. There are trigraphs, which are three letter phonemes and there are quadgraphs, which are less common, which are four letter graphemes. Regardless of the amount of letters there to make a single sound, the digraphs, trigraphs and quadgraphs are all under the same scope of "graphemes" and will be referred to as "graphemes" in the present application.

In teaching language literacy to individuals, phonemes and grapheme combinations are used to teach reading and writing by singing songs, ie, "(letter a) apple (sound /a/ /a/) apple with a picture showing an apple. When individuals are taught this, anytime they see the letter 'a' in a word they are reminded of that apple and say "/a/ apple" to remember what the letter a sounds like. Teaching phoneme and grapheme relationships are a proven method for teaching language. These teachings go from pre-k to about 2nd grade. When a person does not catch on or learn fast enough, practice reading, or has a disability, the idea of spelling and reading can be incredibly overwhelming and by the time anyone realizes there's actually a problem, they are two or more grade levels behind.

There are known voice to text transcribing computer software applications. There are one or more known patents that disclose transcribing phonemes from someone's voice into text.

SUMMARY OF THE INVENTION

In at least one embodiment of the present invention, a phonemic keyboard or interface and computer software stored in computer memory and executed by a computer processor are provided. In at least one embodiment the computer processor implements the computer software to transcribe text, and to provide an accessibility and an educational tool for typing a written language, reading, and speech.

In at least one embodiment of the present invention, an apparatus is provided which includes: a computer processor; a computer memory; and a computer display; and an audio speaker; wherein the computer memory has computer programming stored therein which is configured to be implemented by the computer processor to display a keyboard having a plurality of keys on the computer display; wherein each of the plurality of keys includes indicia for a phonemic sound; and wherein the computer programming stored in the computer memory is configured to be implemented by the computer processor to cause a sound corresponding to the phonemic sound of each corresponding key of the plurality of keys to be emitted from the audio speaker when each key of the plurality of keys is selected.

In at least one embodiment, the computer programming stored in the computer memory is configured to be implemented by the computer processor to determine a plurality of grapheme outcomes for each of the plurality of keys when each of the plurality of keys is selected.

In at least one embodiment of the present invention, the computer programming stored in the computer memory is configured to be implemented by the computer processor to process a plurality of selections of more than one of the plurality of keys, and to generate a plurality of word choices for the plurality of selections.

In at least one embodiment of the present invention, the computer programming stored in the computer memory is configured to be implemented by the computer processor to provide a plurality of audio outputs which are audio representations corresponding to the plurality of word choices.

In at least one embodiment of the present invention, the computer programming stored in the computer memory is configured to be implemented by the computer processor to provide a plurality of visual outputs which are visual representations corresponding to the plurality of word choices.

In at least one embodiment of the present invention, the computer programming stored in the computer memory is configured to be implemented by the computer processor to display a visual representation on the computer display of a correct facial position for sounding out each phonemic sound corresponding to each key of the plurality of keys.

In at least one embodiment of the present invention, the computer programming stored in the computer memory is configured to be implemented by the computer processor to provide visual indicia for each of the plurality of grapheme outcomes.

A method is also provided, in one or more embodiments of the present invention, which may include using a computer processor to display a keyboard having a plurality of keys on a computer display in accordance with computer programming stored in computer memory, wherein each of the plurality of keys includes indicia for a phonemic sound; and using the computer processor to cause a sound corresponding to the phonemic sound of each corresponding key of the plurality of keys to be emitted from an audio speaker when each key of the plurality of keys is selected, in accordance with computer programming stored in computer memory.

The method may further include using the computer processor to determine a plurality of grapheme outcomes for each of the plurality of keys when each of the plurality of keys is selected, in accordance with computer programming stored in computer memory.

The method may further include using the computer processor to process a plurality of selections of more than one of the plurality of keys, and to generate a plurality of word choices for the plurality of selections, in accordance with computer programming stored in computer memory.

The method may further include using the computer processor to provide a plurality of audio outputs which are audio representations corresponding to the plurality of word choices, in accordance with computer programming stored in computer memory.

The method may further include using the computer processor to provide a plurality of visual outputs which are visual representations corresponding to the plurality of word choices, in accordance with computer programming stored in computer memory.

The method may further include using the computer processor to display a visual representation on the computer display of a correct facial position for sounding out each phonemic sound corresponding to each key of the plurality of keys, in accordance with computer programming stored in computer memory.

The method may further include using the computer processor to provide visual indicia for each of the plurality of grapheme outcomes, in accordance with computer programming stored in computer memory.

DETAILED DESCRIPTION OF THE DRAWINGS

Figure 1:
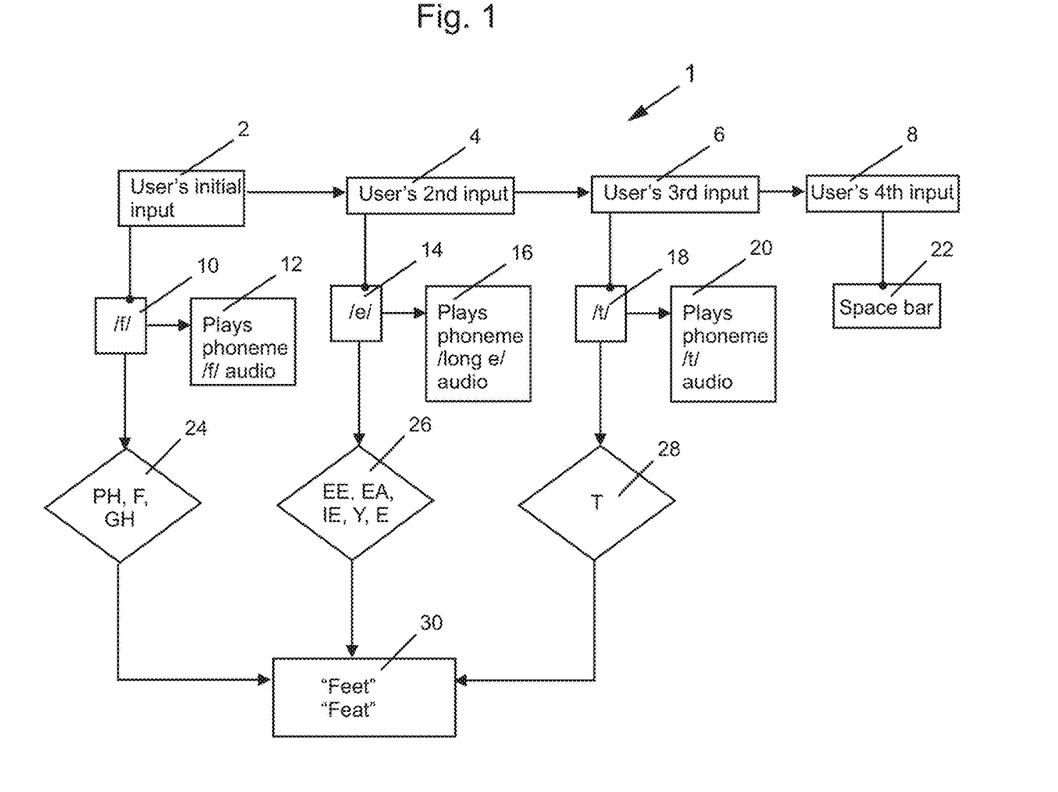
FIG. 1 is a first flow chart.

FIG. 1 is a first flow chart 1. The flow chart 1 may be executed by a computer device 800 shown in simplified block diagram form in FIG. 9. The computer device 800 may be a personal computer, a tablet computer, a smart phone, or other type of computer.

Figure 9:
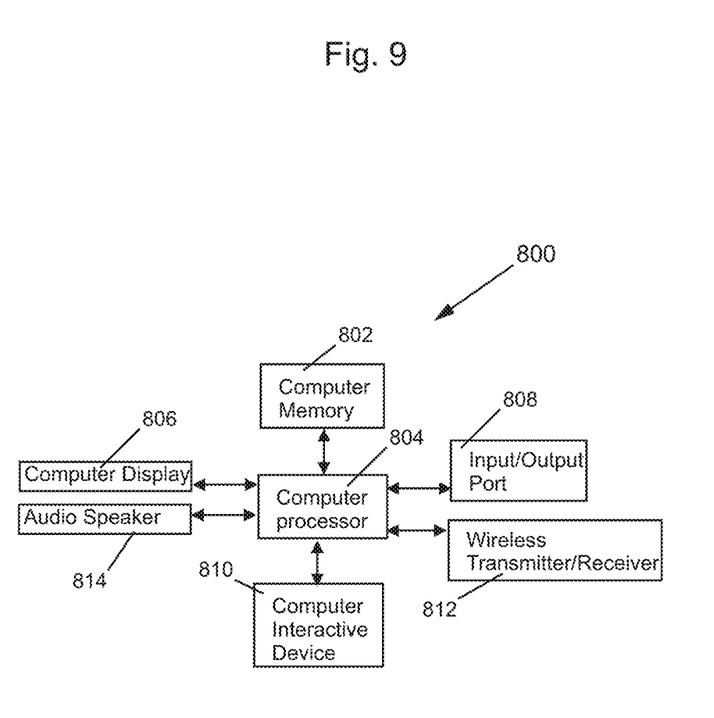
FIG. 9 is a simplified block diagram of a computer device and related components.

The computer device 800 may include a computer memory 802, a computer processor 804, a computer display or monitor 806, a computer interactive device 810, an input/output port 808, a wireless transmitter/receiver 812, and an audio speaker 814.

The computer interactive device 810 may include a keyboard, a computer mouse, and/or a touch screen for inputting information into the computer processor 804 and/or computer memory 802.

The input/output port 808 may include one or more ports for connecting to the internet. The wireless transmitter/receiver 812 may be configured to communicate with the internet.

The computer memory 802 may have computer software stored therein which it's configured to be executed by the computer processor 804.

The components 802, 806, 810, 808, 812, and 814 are configured to communicated with the computer processor 804, such as through hardwired or wireless communication links.

Method steps of the flow chart 1 are executed by the computer processor 804 in accordance with computer software stored in computer memory 802.

At step 2, of FIG. 1, a user may enter an initial input, such as through computer interactive device 810 into computer memory 802, in accordance with computer software stored in computer memory 802, as implemented by computer processor 804.

Figure 3:
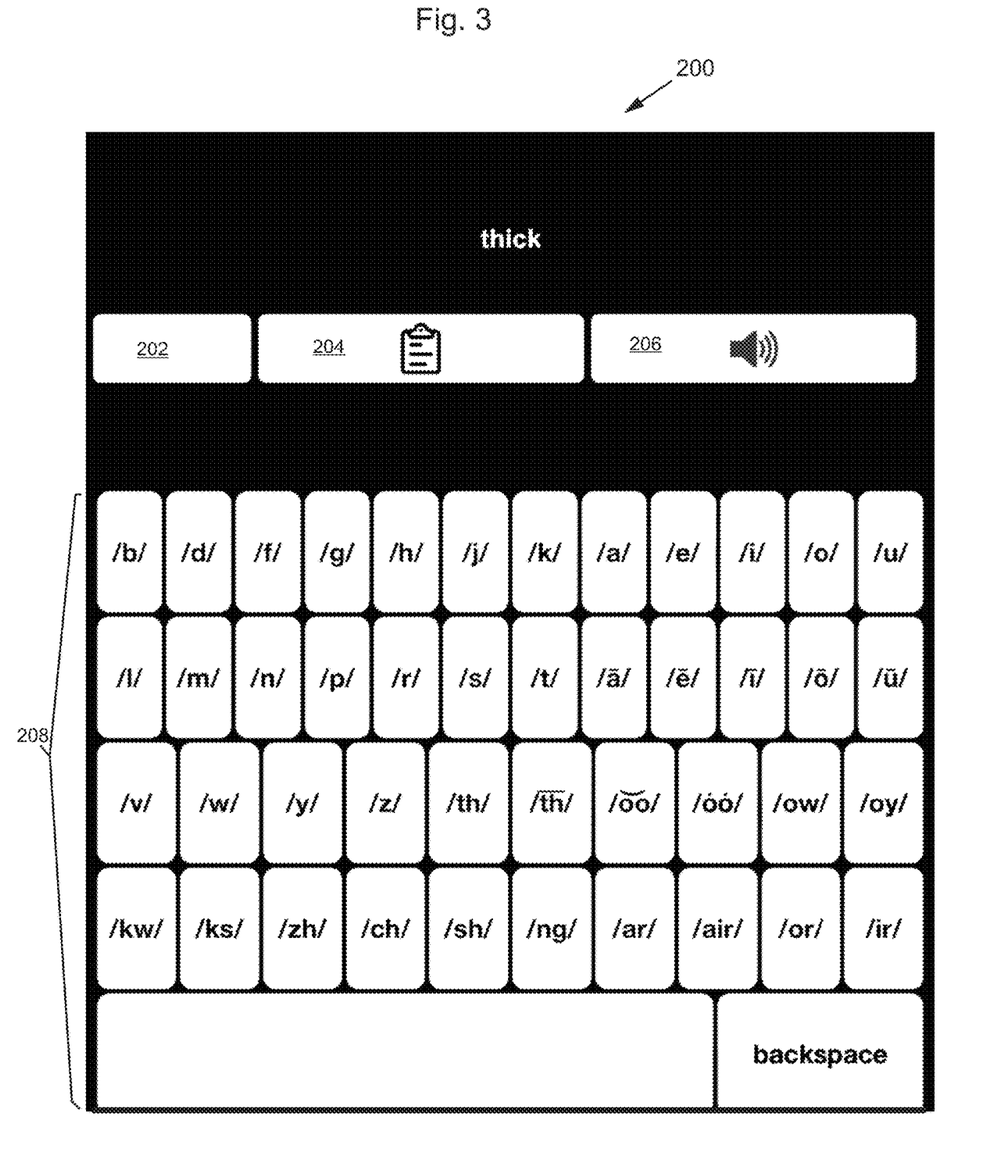
FIG. 3 is first keyboard, set of keyboard fields, or keyboard image layout.

As an example, the initial input entered at step 2, may be the character "/f/" shown at step 10 in FIG. 1, entered by pressing the key or field "/f/" of a plurality of keys 208 of keyboard or keyboard layout 200 shown in FIG. 3. In response to the entry of "/f/", the computer processor 804 implements computer programming stored in computer memory 802 to cause a phoneme audio sound corresponding to /f/, to be played and/or emitted from the audio speaker 814 at step 12.

The sound /f/ corresponds to a "PH", "F", or "GH" letters or letter combinations called graphemes as shown by step 24.

At step 4, of FIG. 1, a user may enter a second input, such as through computer interactive device 810 into computer memory 802, in accordance with computer software stored in computer memory 802, as implemented by computer processor 804.

As an example, the second input entered at step 4, may be the character "/e/", shown at step 14 in FIG. 1, entered by pressing the key or field "/e/" of the plurality of keys 208 of keyboard or keyboard layout 200 shown in FIG. 3. In response to the entry of "/e/", the computer processor 804 implements computer programming stored in computer memory 802 to cause a phoneme audio sound corresponding to /long e/, to be played and/or emitted from the audio speaker 814 at step 16.

The sound long /e/ corresponds to a "EE", "EA", "IE", "Y", or "E" letters or letter combinations called graphemes as shown by step 26.

At step 6, of FIG. 1, a user may enter a third input, such as through computer interactive device 810 into computer memory 802, in accordance with computer software stored in computer memory 802, as implemented by computer processor 804.

As an example, the third input entered at step 6, may be the character "/t/", shown at step 18 in FIG. 1, entered by pressing the key or field "/t/" of the plurality of keys 208 of keyboard or keyboard layout 200 shown in FIG. 3. In response to the entry of "/t/", the computer processor 804 implements computer programming stored in computer memory 802 to cause a phoneme audio sound corresponding to phoneme /t/, to be played and/or emitted from the audio speaker 814 at step 16.

The sound /t/ corresponds to a "T" letter called a grapheme as shown by step 28.

At step 8, of FIG. 1, a user may enter a fourth input, such as through computer interactive device 810 into computer memory 802, in accordance with computer software stored in computer memory 802, as implemented by computer processor 804.

As an example, the fourth input entered at step 8, may be the space bar, shown at step 22 in FIG. 1, entered by pressing the key or field of the plurality of keys 208 of keyboard or keyboard layout 200, which is a large white blank space to the left of the backspace key, shown in FIG. 3. In response to the entry of the space bar, the computer processor 804 implements computer programming stored in computer memory 802 to stored information in computer memory 804 to indicate that entry of a word, in this example has ended.

After the entry of the space bar of keys 208, the computer processor 804 implements computer programming in the computer memory 802 to cause the word "feet" or the word "feat" to be played in audio form from the audio speaker 814 by putting together the sounds from steps 24, 26, and 28. These spoken audio words, in at least one embodiment of the present invention, are formed by the computer processor 804 combining a grapheme from each of steps 24, 26, and 28 in FIG. 1 and checking that against a dictionary in computer memory 802 or over the internet for example, that allows audio feedback capabilities, which is written into the software stored in computer memory 802.

Figure 2:
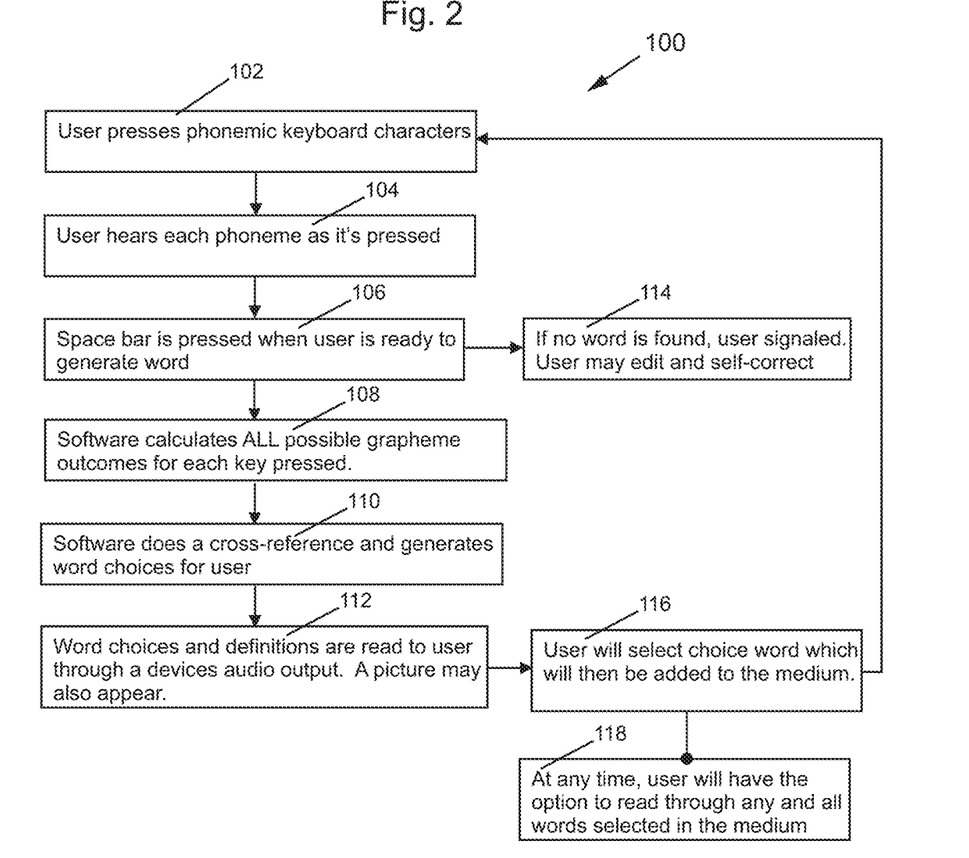
FIG. 2 is a second flow chart.

FIG. 2 is a second flow chart 100. The flow chart 100 includes step 102 where a user presses phonemic keyboard characters, such as the characters "/f/", "/e/", and "/t/", as in previous example of the plurality of keys 208 of keyboard 200, of the computer interactive device 810 of the computer device 800.

The flow chart 100 next includes step 104 where the user hears each phoneme (i.e. each of "/f/", "/e/", and "/t/", in this example) as it is pressed, by the computer processor 804 playing audio corresponding to each phoneme through the speaker 814, as determined by computer software in the computer memory 802.

Next at step 106, the space bar of the keys 208 is pressed when the user is ready to generate a word.

At step 114 if no word is found in the computer memory 802, or such as by searching the internet or other dictionaries, through input/output port 808 or through wireless transmitter/receiver 812, as implemented by the computer processor 804 in accordance with computer programming stored in the computer memory 802, then the user is provided a message, such as displayed on computer display 806 and/or through audio speaker 814, to correct or edit the user's previous entries.

However, if there are possible word choices for the user's entries, computer software stored in the computer memory 802 is implemented by the computer processor to determine and/or calculate all possible grapheme outcomes for each key pressed and/or each combination of keys pressed, at step 108.

At step 110 the computer processor 804 does a cross-reference and generated word choices for the user, such as on the computer display 806 and/or through the audio speaker 814, in accordance with computer software stored in the computer memory 802.

At step 112, one or more word choices and definitions, which may typically be a plurality of word choices and definitions, are provided by the computer processor 804 in accordance with software stored in computer memory 802 through audio output to the user through the audio speaker 814, and pictures corresponding to word choices may also be provided by visual output to computer display 806.

At step 116, the user will select one word choice of typically a plurality of word choices, by using computer interactive device 810, which will then be added to the medium that is being typed in, such as for example a Microsoft (trademarked) word (trademarked) document, a text, a search bar, or some other medium, such as adding and storing in computer memory 802.

At step 118, the user will have the option to read through any and all words selected in the medium, document, or search bar or in the computer memory 802, by having the words sounded out through audio outputs provided through speaker 814 by computer processor 804 in accordance with computer programming in the computer memory 802.

FIG. 3 is first keyboard 200, set of keyboard fields, or keyboard image layout 300. The keyboard 200 includes a topmost field, which has a black background and shows the word "thick" in white, as an example of a word that has been entered using the computer interactive device 802, on which the keyboard 200 may be located.

The keyboard 200 includes field 202 which is a "save" field for saving entries by a user using keyboard 200. The keyboard 200 further includes field 204 which in at least one embodiment is selected or pressed to provide a "copy/paste" feature; and field 206 which is selected or pressed to play audio of a highlighted text, such as audio of one word, or many sentences or paragraphs. The icons for 202, 204, and 206 may have a different appearance that what is shown in FIG. 3.

The keyboard 200 includes a plurality of keys or fields 208. Each key or field of the plurality of fields 208 can be selected and/or pressed to enter a particular key or field. A first row of the plurality keys 208 includes keys for /b/, /d/, /f/, /g/, /h/, /j/, /k/, /a/, /e/, /i/, /o/, and /u/. A second row of the plurality of keys 208 includes keys for /i/, /m/, /n/, /p/, /r/, /s/, /t/, /ā/, /ē/, /ī/, /ō/, and /ū/. A third row of the plurality of keys 208 includes keys for /v/, /w/, /y/, /z/, /th/, /t͟h/, /ŏŏ/, /ŏŏ/, /ow/, and /oy/. A fourth row of the plurality of keys 208 includes keys for /kw/, /ks/, /zh/, /ch/, /sh/, /ng/, /ar/, /air/, /or/, and /ir/. The fifth row of the plurality of keys 208 includes keys for the space bar (which is large white blank area), and a "backspace" key.

Figure 4:
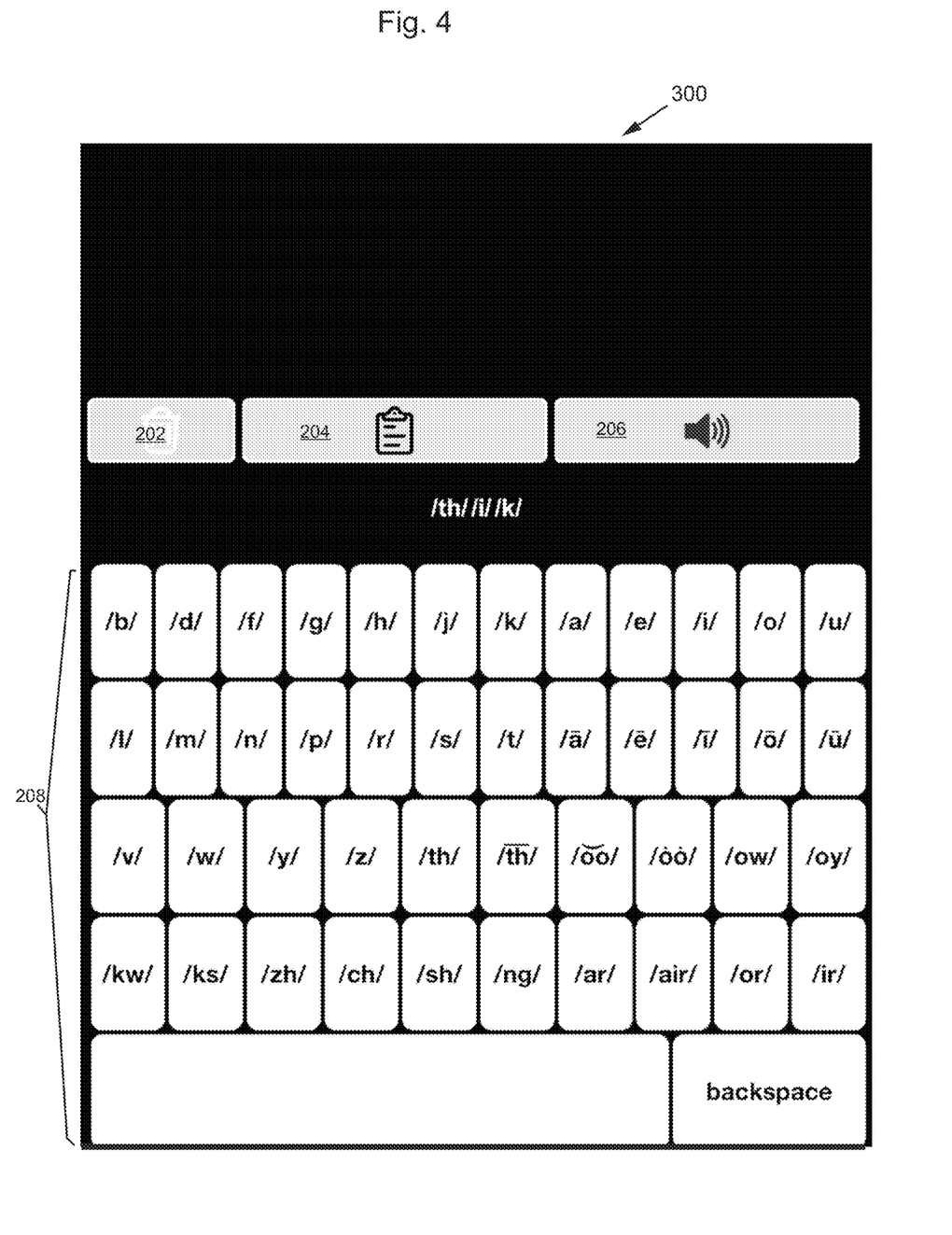
FIG. 4 is a second keyboard, set of keyboard fields, keyboard image layout.

FIG. 4 is a second keyboard, set of keyboard fields, keyboard image layout 300. The keyboard 300 may be identical to the keyboard 200, except as will be described. The keyboard 300 shows "/th/ /i/ /k/" displayed between the row of fields 202, 204, and 206, and the plurality of keys 208. The characters "/th/ /i/ /k/" are displayed in response to pressing or selecting those characters of the keys 208. The keyboard 300 display of "/th/ /i/ /k/", in at least one embodiment, shows the keys pressed by the user before the space bar is pressed.

Figure 5:
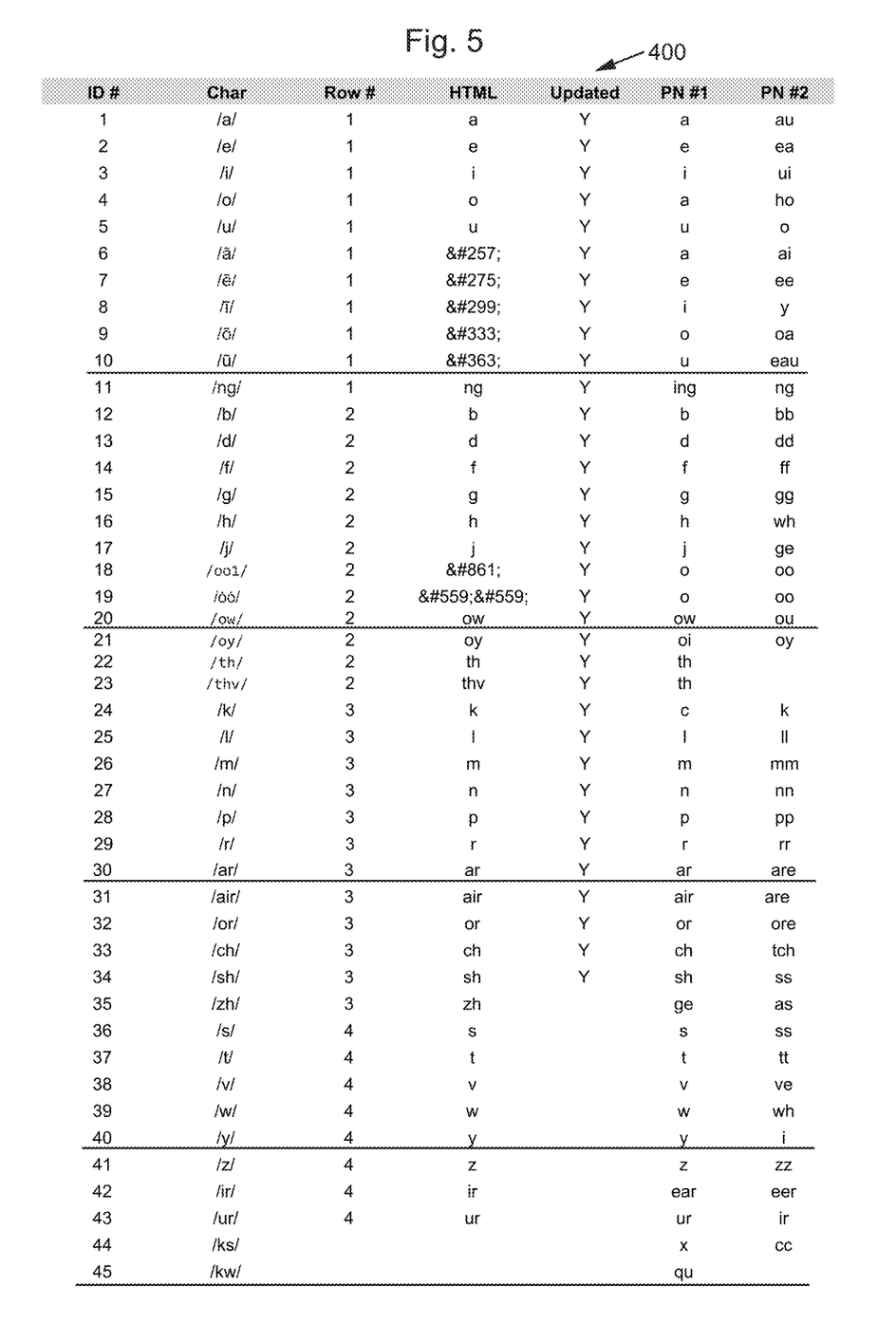
FIG. 5 is a first table.

FIG. 5 is a first table 400 with information for forty-five (ID #1-45) phonemes or characters which are identified by the heading "Char". The first row of table 400 is a heading row. Each of the next forty-five rows of the table 400 has an identification number (ID#), a character or phoneme indication (Char); and may have a row number of the plurality of keys 208 (Row#), an HTML identification (HTML), an updated indication, (Updated), which in at least one embodiment, may indicate whether software has been updated. The PN #1 column identifies a first possible letter choice (grapheme) that is connected to the phoneme (sound) in the same row. For example, the letter choice "a" in the first row (not counting heading row), is connected to the phoneme (sound) /a/. The PN #2 column is a second possible letter choice (grapheme) that is connected to the phoneme (sound) in the same row. For example, the letter choice "au" in the first row (not counting heading row) is connected to the phoneme (sound) /a/. PN#3, PN#4, PN#5, PN#6, PN#7, PN#8, PN#9, and PN#10 shown in FIG. 6, and PN#11 and PN#12 shown in FIG. 7 are further possible letter choices (if any, some are shown blank) connected to the appropriate phoneme (sound) in the corresponding row.

Figure 6:
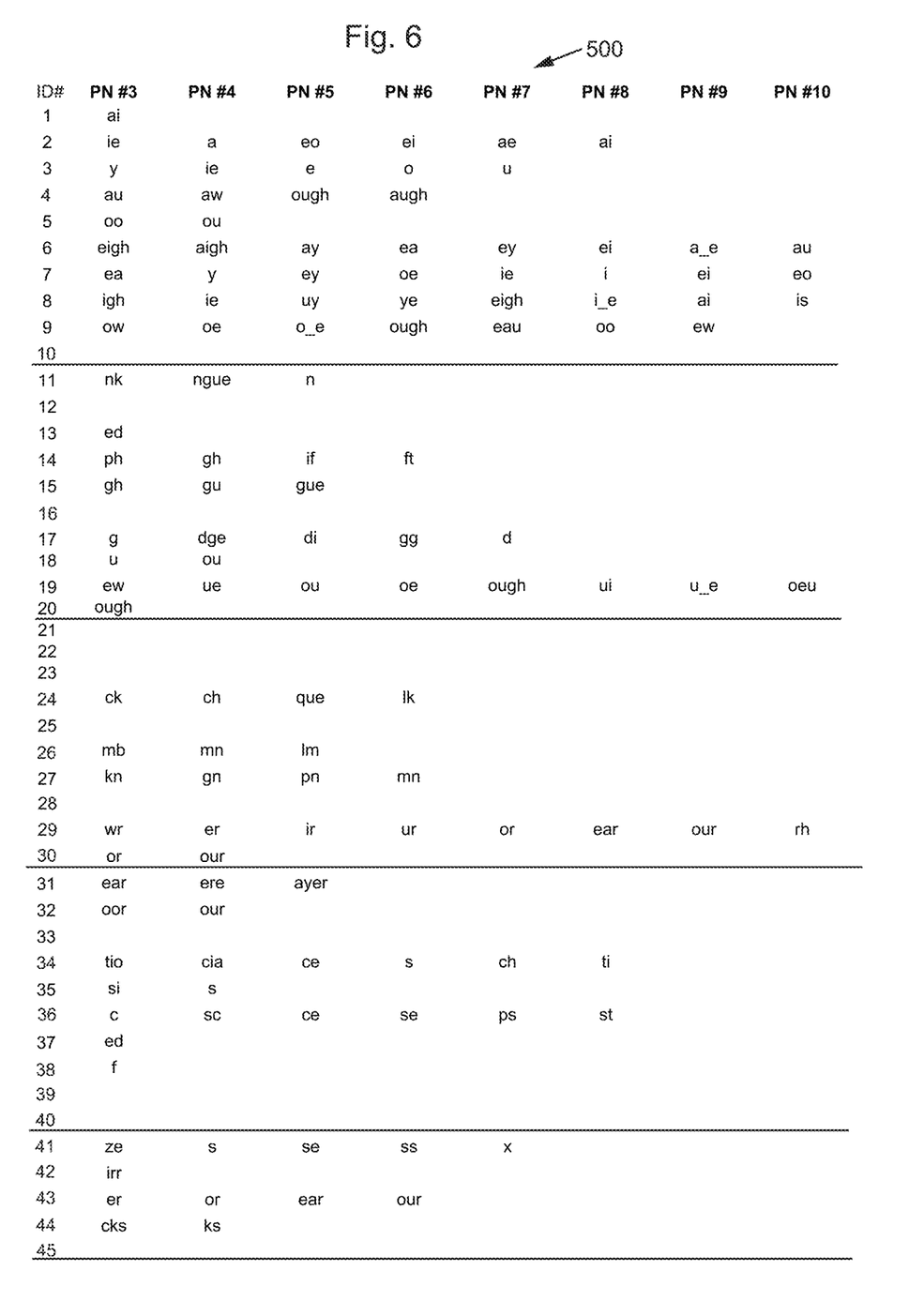
FIG. 6 is a second table.

FIG. 6 is a second table 500 with further information for the forty-five phonemes or characters. Each of the forty-five rows (not including the header row), may include a PN#3-PN#10 letter choices as previously described.

Figure 7:
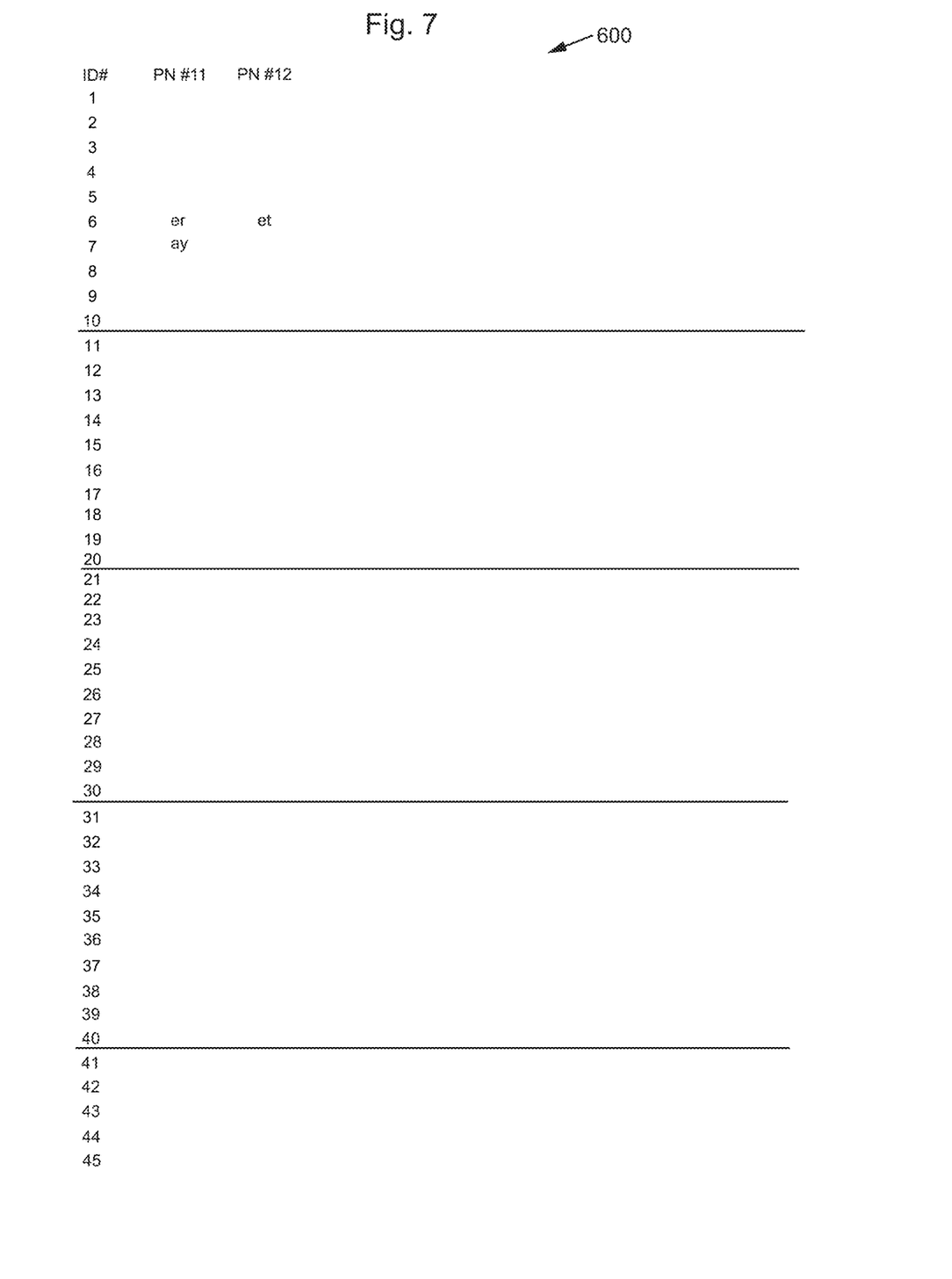
FIG. 7 is a third table.

Again, in at least one embodiment, PN#'s as referred to in FIGS. 5-7, are the ways in which a phoneme can be spelled. Some sounds (phonemes) are spelled multiple different ways. For example /long e/ sound can be spelled using just a letter 'e' like in "we" or ea like in the word eat or like ie like the word piece or with an ee like in need.

At least one embodiment of the present invention eliminates the complicated task of spelling and memorizing different abstract spelling concepts and using technology to improve an illiterate individual's means of typing by way of direct and concrete sound keys with phonemic representations. The computer processor 804 implements computer software stored in computer memory 802 to eliminate the guesswork and many choices for spelling the same sound. The user can memorize keyboard characters with audio sounds a lot better than they can pull abstract spelling patterns from thin air, the computer processor 804 generates these options based on word/dictionary references from computer memory 802 or from some other source such as the internet.

FIG. 7 is a third table 600 with further information for the forty-five phonemes or characters. Each of the forty-five rows (not including the header row), may include columns for PN#11, and PN#12 as previously described.

Figure 8:
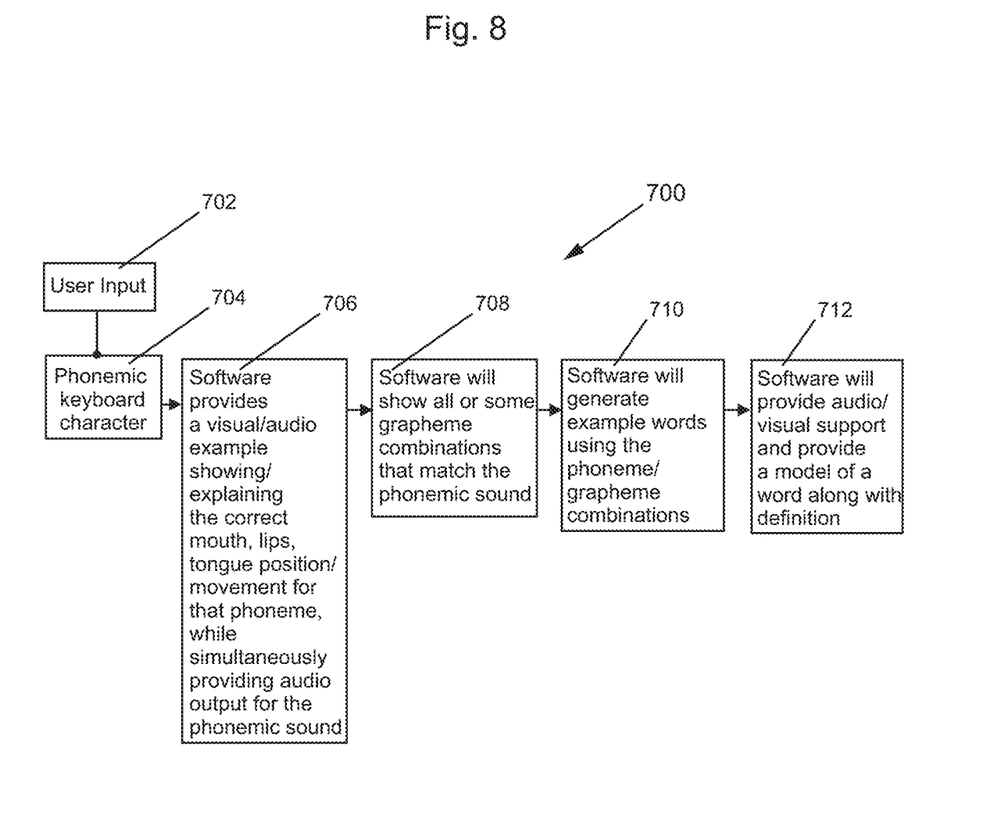
FIG. 8 is a third flow chart.

FIG. 8 is a third flow chart 700 of a method which may be executed by computer processor 804 in accordance with computer programming stored in the computer memory 802.

At step 702 a user may provide an input, such as by using keyboard 200 through computer interactive device 810, into computer memory 802, as implemented by the computer processor 804 in accordance with computer programming stored in the computer memory 802.

At step 704, a phonemic keyboard character of the plurality of keys 208 may be entered into computer memory 802. The software stored in computer memory 802 as implemented by the computer processor 804 may provide visual/audio example(s) through computer display 806 and audio speaker 814, respectively, showing/explaining the correct mouth, lips, tongue position/movement for that phoneme, while simultaneously providing audio output through speaker 814 for the phonemic sound as shown in 706.

A step 708 the computer processor 804 in accordance with software stored in computer memory 802 shows all or some grapheme combinations that match the phonemic sound or combination of sounds.

At step 710, the computer processor 804 in accordance with software stored in computer memory 802 generates example words using the phoneme/grapheme combinations.

At step 712, the computer processor 804 in accordance with software stored in computer memory 802 provides audio/visual support via speaker 814 and display 806, respectively, and provide a model of a word along with a definition.

FIG. 9 is a simplified block diagram of the computer device 800 and related components. In at least one embodiment of the present invention, the plurality of keys 208 on the keyboard or use interface 200 or 300 have representations of phonemic characters (instead of alphabetic keys) that allow a user to type, select or press (typically one at a time), the plurality of keys 208, and create text based on the phoneme/grapheme relationships in a given language. The user types using individual phonemic characters of plurality of keys 208 on the keyboard 200 or 300 that are specific to individual phonemic sounds to initiate the computer software stored in computer memory 802 to cause the computer processor 804 to transcribe the phonetic characters into graphemes/digraphs and to typically store these in computer memory 802, thus creating an array or string of accurately spelled text. Additionally, each time a key having a phonemic character is pressed (such as for example the key having "/b/" designation, of keys 208), the user will hear the individual sound produced by that character, by computer processor 804 causing the sound to be produced or emitted on speaker 814 because of software stored in computer memory 802.

The computer processor 804 implements computer software stored in computer memory 802 to generate the graphemes based on phonemic strings and word possibilities in that language. Based on the user's phonemic string sequence, the computer processor 804 implements computer software stored in computer memory 802 to produce grapheme variables and combinations stored in computer memory 802 (or downloaded from the internet) until the space bar (blank white space to the left of back space shown in FIG. 3) is selected or pressed. Once the space bar is selected, the computer processor 804 responds in accordance with computer software stored in the computer memory 802 to indicate that the user is ready to generate the appropriate word.

The computer processor 804 translates those user keystrokes into accurately spelled word choice(s) using the above-mentioned method, in accordance with computer software stored in computer memory 802, that translates the phonemic keyboard key's input into transcribed text based on all phoneme/grapheme and grapheme/grapheme combinations and possibilities in a language, as stored in computer memory 802, or as downloaded, such as from the internet, through input/output port 808 and/or through wireless transmitter/receiver 812. If there is no word found the user will get a notice, such as by display of a visual message on computer display 806 or an audio message on audio speaker 814, in accordance with computer software stored in computer memory 802. The processor 804 plays audio for the word on speaker 814, allowing the user to hear the word, and will display a word or word choice on computer display 806, allowing the user to select the word and go on, defines the word either through display on computer display 806 and/or by audio output emitted by audio speaker 814. The user is able to delete the phonemic keys and self-correct through the computer interactive device 810 (such as through a computer keyboard and/or touchscreen). The computer processor 804 implements computer software stored in computer memory 802 to provide the user with phonemic audio through speaker 815 and visual through display 806 feedback each time a phonemic character of the keys 208 is selected or pressed.

In at least one embodiment, the invention is comprised of a word-prediction, a dictionary, and instant audio feedback of phonemic sounds when one or more of keys 208 are selected or pressed. In at least one embodiment, a playback feature is incorporated so, when ready, the user is able to listen back, via audio speaker 814, as caused by computer processor 804 implementing computer software stored in computer memory 802 and/or downloaded from input/output port 808 and/or wireless transmitter/receiver 812, to what they wrote, while each word is highlighted visually on the computer display 806 for reinforced learning. Much like a traditional keyboard, the phonetic character representation keyboard 200 may also have additional keys needed to navigate the device, which are not shown, such as, but not limited to, numeric keys and an enter key.

In at least one embodiment, the present invention gives an individual the ability to type text, such as using keys 208, without the necessary literacy skills typically required, such as reading and spelling. One or more embodiments of the present invention are especially geared toward individuals with reading and/or writing disabilities, as well as for young literacy learners. The user typically generates typed text without the use of a typical alphabetic keyboard or the use of their voice when using this apparatus and software invention.

In at least one embodiment, the present invention may be described as having two major parts. Firstly, it can be used as an accessibility feature. This means that a user can use the phonemic keyboard apparatus or interface, such as keyboard 200 and the plurality of keys 208, and transcribing software stored in computer memory 802 and/or downloaded or provided, such as from the internet through input/output portion 808 and/or wireless transmitter/receiver 812, as an alternative way to type a language. The software will be able to integrate into other hardware and/or software in order to be compliant with ADA (American Disability Act) accommodations for those with handicaps and disabilities.

In at least one embodiment, the present invention may be used in classroom settings for assignments, job opportunities, for personal communication, as well as for state testing accommodations which will provide individuals with the first ever writing modification for students with disabilities, all while reading and math accommodations already exist.

Generally, in current classrooms, students cannot use "voice to text" typing accommodations during testing or in noisy environments.

A second major part of at least one embodiment of the present invention is that it can be used as an instructional tool to help parents, teachers, and other professionals teach the abstract skill of writing, reading, spelling patterns, and speech patterns. The idea is that users will be able to produce more accurate writing samples through being able to physically see and hear language sounds (phonemes) converted into letter-combinations (graphemes) to form words. The user will in turn, become a better reader and writer through that process of repetition and working memory. The present invention, in at least one embodiment, provides a multi-sensory learning platform that incorporates different learning styles for a more definitive learning experience for the user. Many individuals struggle to identify the different letter sequences for writing because it's an abstract concept and has many variables. There are many different combinations of letters (graphemes) that provide different sounds, as well as many of the same letter combinations that provide different sounds. This can be very overwhelming for an individual who struggles with literacy. Ie: the sound /long e/ can be spelled ee, ea, ei, y and so on. And some of those same letter combinations can be spelled the same and pronounced differently like the grapheme ow can be pronounced /long o/ like in the word "know" and /ow/ like in the word "now."

One or more embodiments of the present invention take the guesswork out of spelling while enforcing the foundational skills of reading through the use of audio phonemic character keys on a keyboard, transcribing software for accuracy, while using a multi-sensory approach and repetition to reinforce learning.

Additionally, one or more embodiments of the present invention are able to show the graphemes and any corresponding phonemic letter combination in a language and in real time as a means of teaching and learning and as a separate entity or in combination with above. In other words, as a means of learning the phonemic sounds and letter combinations that make up those sounds, the user will isolate letters and learn at their own pace taking on each separate phoneme and their possible letter combinations as a means to learn how to read, learn this specific type of keyboard with phonemic keys, or any other use found fit in literacy, including speech.

In at least one embodiment, instead of using voice phonemics, a user types on a specialized phonemic keyboard, such as including keys 208, and the computer processor 804 implements computer software stored in or provided to computer memory 802 to provide sound feedback to the user each time a phonemic key of keys 208 is selected or pressed in order to provide self-correction and learning to the user while typing. The device and software will then calculate each keystroke, as well as each keystroke combination to generate a word and/or word options to the user with the ability to have the definition and word choices read to them, comprised of pictures or photographs, displayed on computer display 806 at times, a playback audio feature played on audio speaker 814 to hear a single word or multiple words which may include a sentence or pages of text that the user types into keyboard or interface 200 or 300.

In at least one embodiment, of the present invention, the user will be able to type a document, an email, in web addresses and search bars, and be accessible anywhere type text is needed. The user will be able to type words, sentences, and paragraphs using computer software of at least one embodiment of the present invention stored in or provided to computer memory 802 as implemented by computer processor 804.

One or more embodiments of the present invention employs kinesthetic, auditory, and visual learning methods while granting individuals the independence and skills they need to be successful. The software as implemented by the computer processor 804, in at least one embodiment, generates correctly spelled words into a document, search/address bar, or any other instance where typing text is needed. In at least one embodiment, the computer software relies on no external voice or audio in order to perform its job of converting phonemes into graphemes, and graphemes into text. This means that the user will not use their own voice to produce phonemes. Instead they will type text using phonemic keys. In at least one embodiment, the user uses phonemic keys to convey a transcribed text or message. In at least one embodiment, keys 208 may be color-coded for easy user discovery and categorized based on best practices for learning literacy.

In at least one embodiment, the plurality of keys 208 may be intelligently geographically placed, which means that the phonemic characters will be placed in such a way that is user-friendly and based on logic which supports teaching and helps the user memorize the location of the keyboard characters for more efficient use of the invention.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a computer processor;
   a computer memory; and
   a computer display; and
   an audio speaker;
   wherein the computer memory has computer programming stored therein which is configured to be implemented by the computer processor to display a keyboard having a plurality of keys on the computer display;
   wherein each of the plurality of keys includes indicia for a phonemic sound;
   wherein the computer programming stored in the computer memory is configured to be implemented by the computer processor to cause a sound corresponding to the phonemic sound of each corresponding key of the plurality of keys to be emitted from the audio speaker when each key of the plurality of keys is selected; and
   wherein the computer programming stored in the computer memory is configured to be implemented by the computer processor to process a plurality of selections of more than one of the plurality of keys, and to generate a plurality of word choices for the plurality of selections.

2. The apparatus of claim 1 wherein
the computer programming stored in the computer memory is configured to be implemented by the computer processor to determine a plurality of grapheme outcomes for each of the plurality of keys when each of the plurality of keys is selected.

3. The apparatus of claim 2 wherein
the computer programming stored in the computer memory is configured to be implemented by the computer processor to provide visual indicia for each of the plurality of grapheme outcomes.

4. The apparatus of claim 1 wherein
the computer programming stored in the computer memory is configured to be implemented by the computer processor to provide a plurality of audio outputs which are audio representations corresponding to the plurality of word choices.

5. The apparatus of claim 1 wherein
the computer programming stored in the computer memory is configured to be implemented by the computer processor to provide a plurality of visual outputs which are visual representations corresponding to the plurality of word choices.

6. An apparatus comprising:
a computer processor;
a computer memory; and
a computer display; and
an audio speaker;
wherein the computer memory has computer programming stored therein which is configured to be implemented by the computer processor to display a keyboard having a plurality of keys on the computer display;
wherein each of the plurality of keys includes indicia for a phonemic sound; and
wherein the computer programming stored in the computer memory is configured to be implemented by the computer processor to cause a sound corresponding to the phonemic sound of each corresponding key of the plurality of keys to be emitted from the audio speaker when each key of the plurality of keys is selected; and
wherein
the computer programming stored in the computer memory is configured to be implemented by the computer processor to display a visual representation on the computer display of a correct facial position for sounding out each phonemic sound corresponding to each key of the plurality of keys.

7. A method comprising:
using a computer processor to display a keyboard having a plurality of keys on a computer display in accordance with computer programming stored in computer memory, wherein each of the plurality of keys includes indicia for a phonemic sound;
using the computer processor to cause a sound corresponding to the phonemic sound of each corresponding key of the plurality of keys to be emitted from an audio speaker when each key of the plurality of keys is selected, in accordance with computer programming stored in computer memory; and
using the computer processor to process a plurality of selections of more than one of the plurality of keys, and to generate a plurality of word choices for the plurality of selections, in accordance with computer programming stored in computer memory.

8. The method of claim 7 further comprising
using the computer processor to determine a plurality of grapheme outcomes for each of the plurality of keys when each of the plurality of keys is selected, in accordance with computer programming stored in computer memory.

9. The method of claim 8 further comprising
using the computer processor to provide visual indicia for each of the plurality of grapheme outcomes, in accordance with computer programming stored in computer memory.

10. The method of claim 7 further comprising
using the computer processor to provide a plurality of audio outputs which are audio representations corresponding to the plurality of word choices, in accordance with computer programming stored in computer memory.

11. The method of claim of 7 further comprising
using the computer processor to provide a plurality of visual outputs which are visual representations corresponding to the plurality of word choices, in accordance with computer programming stored in computer memory.

12. A method comprising:
using a computer processor to display a keyboard having a plurality of keys on a computer display in accordance with computer programming stored in computer memory, wherein each of the plurality of keys includes indicia for a phonemic sound;
using the computer processor to cause a sound corresponding to the phonemic sound of each corresponding key of the plurality of keys to be emitted from an audio speaker when each key of the plurality of keys is selected, in accordance with computer programming stored in computer memory; and
using the computer processor to display a visual representation on the computer display of a correct facial position for sounding out each phonemic sound corresponding to each key of the plurality of keys, in accordance with computer programming stored in computer memory.

\* \* \* \* \*